United States Patent [19]
Morel

[11] Patent Number: 4,602,819
[45] Date of Patent: Jul. 29, 1986

[54] PART ADAPTED TO ENSURE COMFORT IN A VEHICLE SEAT, ESPECIALLY AN AUTOMOTIVE VEHICLE SEAT

[75] Inventor: Henri Morel, Maule, France

[73] Assignee: I.T.W. de France, Beauchamp, France

[21] Appl. No.: 496,348

[22] Filed: May 19, 1983

[30] Foreign Application Priority Data

May 27, 1982 [FR] France .................... 82 09235

[51] Int. Cl.⁴ .............................. A47C 7/02
[52] U.S. Cl. .................... 297/460; 297/452
[58] Field of Search ............... 297/452, 460; 267/142–146, 133, 160

[56] References Cited

U.S. PATENT DOCUMENTS

| | | | |
|---|---|---|---|
| 1,718,847 | 6/1929 | Bell | 297/466 |
| 2,812,146 | 11/1957 | Chaplin | 297/452 |
| 3,610,685 | 10/1971 | Lay | 297/460 |
| 3,860,287 | 1/1975 | Platt | 297/452 |
| 4,147,336 | 4/1979 | Yamawaki et al. | 297/452 |
| 4,331,361 | 5/1982 | Krakauer | 297/460 |
| 4,368,917 | 1/1983 | Urai | 297/452 |

FOREIGN PATENT DOCUMENTS 910101 11/1962 United Kingdom ........... 297/452

Primary Examiner—William E. Lyddane
Assistant Examiner—Joseph Falk
Attorney, Agent, or Firm—Trexler, Bushnell & Wolters, Ltd.

[57] ABSTRACT

The object of the invention is a unitary part for ensuring comfort to the seat of a vehicle, more particularly the back of a seat of automotive vehicle having a frame, elastic means connecting said unitary part to said frame, said unitary part consisting of a supple grid, integrally made spacer elements of said grid being hooked on said elastic means whereby said unitary part forms a part both for accompanying the back of the sitter in his vertical motions and for accompanying lateral rolling motions of the back mainly through deformation thereof.

2 Claims, 7 Drawing Figures

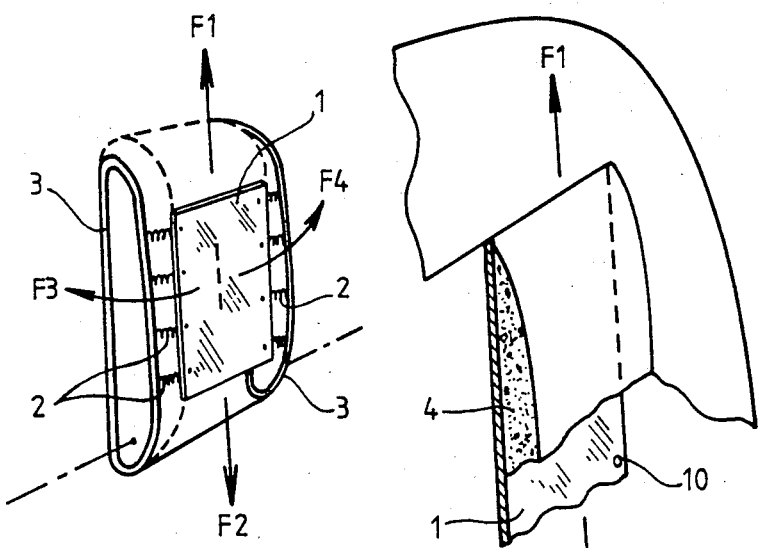
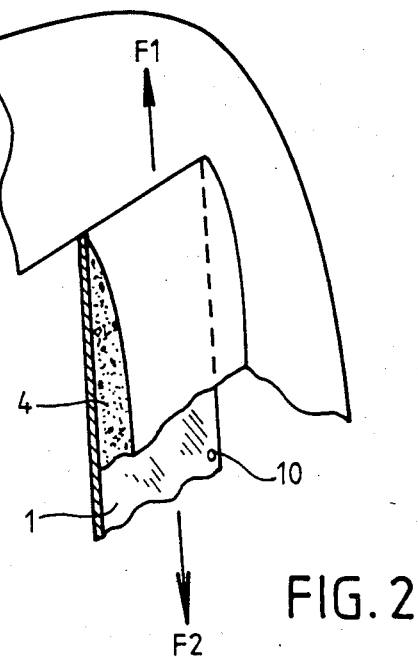
FIG. 1    FIG. 2
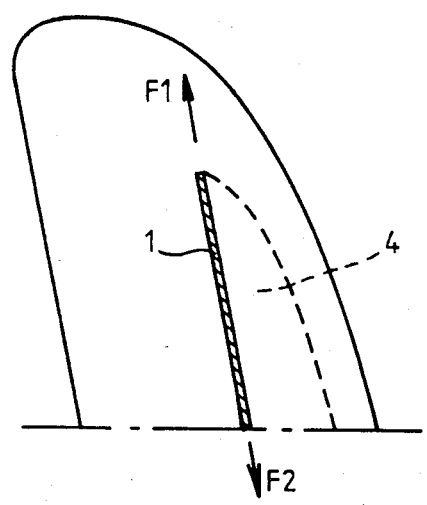
FIG. 3

4,602,819

PART ADAPTED TO ENSURE COMFORT IN A VEHICLE SEAT, ESPECIALLY AN AUTOMOTIVE VEHICLE SEAT

This invention relates to a part adapted to ensure comfort in a vehicle seat, especially an automotive vehicle seat. Such part is particularly suitable for the back of a seat but may also be fitted to the seat proper on which somebody sits.

Seats are known, in which the seat back and the seat itself are disposed one after the other with a predetermined angle therebetween; however it is usual in vehicles and particularly automotive vehicles to provide a hinged seat to produce variable inclination of the seat back thereby making the seat back independent relative to the seat itself both in the realization and the functional possibilities thereof.

As a rule, the furniture manufacturers produce the socalled folding beds in which a bed portion can be inclined relative to the remainder of the bed so as to enable the trunk or a portion of the trunk of the occupant of the bed to be lifted up. Such beds generally comprise a cloth supported in a metallic frame and connected through an elastic bond or springs to said frame.

In the general domain of pieces of furniture there are socalled metallic beds in which a supple mattress formed of steel wires is connected to the bed frame through a series of springs, such springs being able to provide connection either with the four sides of the frame or only with two opposite sides thereof.

It is to be noted that any deformation of the cloth or mattress is transmitted to the assembly of cloth or mattress since both of them substantially cover all the bed surface. The same applies to the above mentioned seat in which seat and seat back follow each other.

This is disadvantageous when the seats are especially intended for automotive vehicles which have different behaviours depending on whether it is dealt with the seat element proper or the seat back element.

The seat back element is an integral part of the suspended masses in the vehicle but also comprises specific means for suspending the mass represented by the occupant of the seat. The position of the seat element is therefore not exactly the general position of the suspended masses.

On the other hand, the seat back element must be considered as an element directly connected to the general position or trim of the suspended masses, thereby resulting into disparity in the movements of the occupant of the seat and the motions of the seat back.

The behaviour of the occupant's back relative to the seat back may be mainly considered as a substantially vertical sliding movement of the back against the seat back.

The seat occupant's back has also other motions which are formed by lateral rolling movements which are voluntary or not.

Known seat back elements are either mesh arrangements of wires, strings, cords or the like within a rectangular peripheral frame which can only twist on itself or disk-like elements or concave configurations which cannot be deformed even made in a plastic material.

The object of the present invention is a unitary part for ensuring comfort to the seat of a vehicle, more particularly the back of a seat of automotive vehicle having a frame, elastic means connecting said unitary part to said frame, said unitary part consisting of a supple grid, integrally made spacer elements of said grid being hooked on said elastic means whereby said unitary part forms a part both for accompanying the back of the sitter in his vertical motions and for accompanying lateral rolling motions of the back mainly through deformation thereof.

Subsidiarily, the unitary part according to the invention is provided with strap elements also integrally made therewith and adapted more particularly to support the stuffing masses provided therein.

The material constituting the grid or the spacer and/or strap assembly is advantageously in form of an easily mouldable plastics material having properties corresponding to those desired for the unitary part according to the invention, which is a part adapted for accompanying vertical motions of the back, in particular, due to the action of the elastic means provided therefor and for accompanying the rolling motions of the back in particular through deformation of the plate or the spacer grid assembly.

The unitary grid according to the invention may comprise reinforcing spacers, for example, close to the cervical vertebrae and the shape of the grid in that point can be modified to conform to an upwardly directed substantially trapezoidal perimeter.

The supple unitary part (element 1 or grid 5) comprises holes or eyes for hooking thereat elastic means such as springs.

The unitary part according to the invention can also be applied independently of the seat back to the seat section itself to provide for suspension of the mass constituted by the occupant while deforming in accordance with the contour of such mass.

Other characteristics and advantages of this invention will better appear from the following description which is made in reference to the attached drawings in which:

FIG. 1 is a schematical perspective view of a seat back comprising a unitary part according to a first form of embodiment of the invention;

FIG. 2 is a detailed perspective view of such unitary part provided with its stuffing and disposed flush with the seat back;

FIG. 3 is a partial sectional view of a seat back with said unitary part disposed inside the seat back;

In the form of embodiment shown in FIGS. 1 to 3 the supple unitary part capable of following vertical movements of the occupant's back is a supple element 1 elastically mounted by means of springs 2 to the rigid frame 3 of the seat back.

Such plate accompanying the motions of the back may be flush with the contacting surface of the seat back as shown in FIG. 2 while being without any appropriate stuffing 4.

According to an alternative form of embodiment, the supple element for accompanying the motions of the back is disposed in the inside of the seat back (FIG. 3).

Due to the elastic mounting thereof, the supple element 1 can follow vertical motions F1–F2 of the back. Because of its suppleness and the elastic mounting thereof, the supple element 1 can also follow lateral motions of the occupant's back (F3-F4). Deformation of the supple element may also take place in the general direction F1-F2 so as to follow up the curve of the seat occupant's back.

Figure 4:
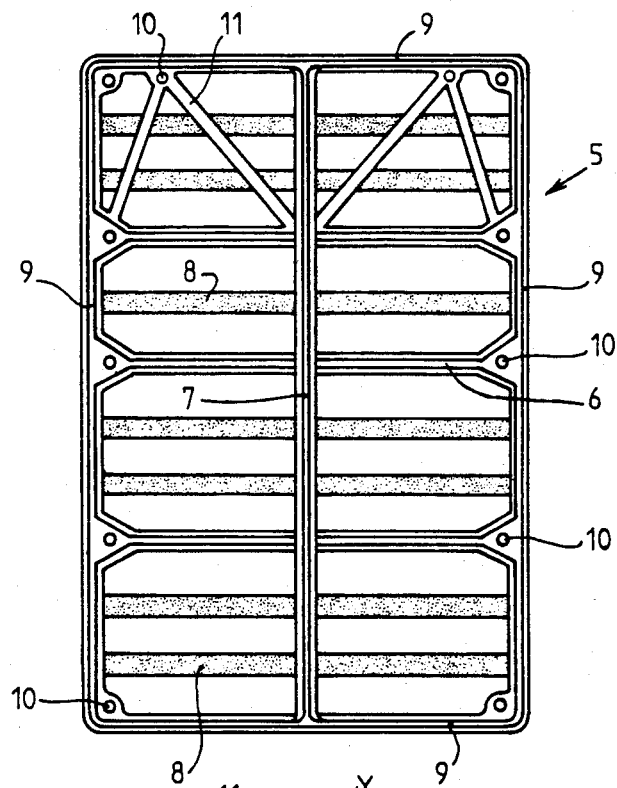
FIG. 4 is a plane view of another form of embodiment of the unitary part according to the invention.
Figure 5:
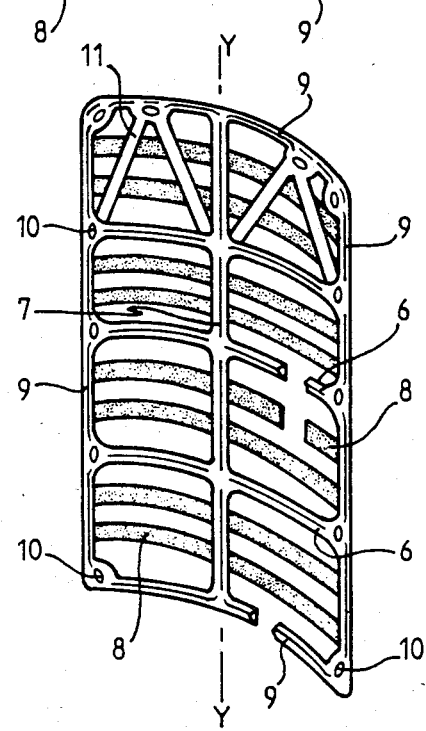
FIGS. 5 and 6 are perspective views of the same part during deformation thereof (FIG. 6 shows a variation in its upper portion)
Figure 6:
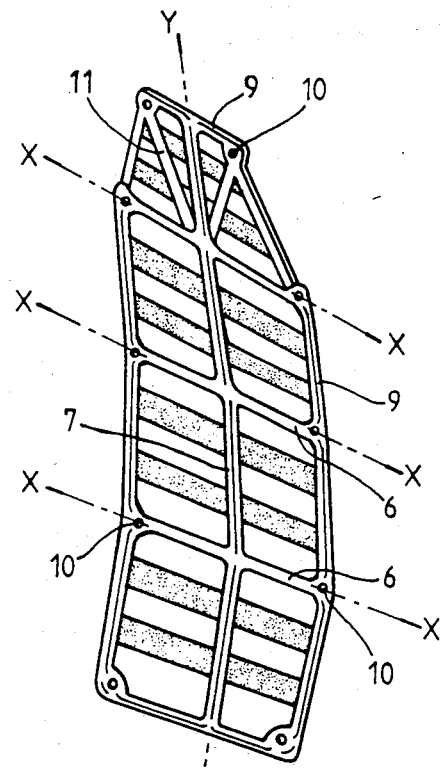

In the form of embodiment shown in FIGS. 4 to 6 the supple unitary part is a grid 5 with spacer elements 6 and 7 and straps 8 for maintaining the stuffing provided therein which may be made of a foam.

In both forms of embodiment shown, the supple unitary part according to the invention is preferably manufactured from a mouldable plastics material to provide the unitary nature and suppleness thereof.

In the form of embodiment shown in FIGS. 4 to 6, spacers and the straps are integrally made as is the contour 9 of the grid. The supple element 1 and the grid 5 are both formed with holes or eyes 10 from hooking thereat elastic means which may be springs, elastic bonds or any other similar means.

In the form of embodiment of the FIGS. 4 to 6, the eyes 10 are formed in the extension of horizontal spacers 6 which constitute as many preferential deformation axes x—x. A vertical spacer 7 itself constitutes a deformation axis y—y. It will be understood that other vertical spacers can be provided.

The eyes 10 make the mounting of the unitary part easier due to the accurate indexing afforded thereby, with positioning errors of the elastic means being thus practically excluded thereby preventing any unbalanced forces.

Other local reinforcing spacers 11 can be integrally made on at least one grid section the contour 9 of which can advantageously comprise ribs thereon and may be of any type.

In FIGS. 4 to 6 the reinforcing spacers 11 are disposed in proximity to the cervical vertebrae of the seat occupant. The contour portion 9 is made in form of a trapezium upwardly directed at that point of the cervical vertebrae in the form of embodiment of FIG. 6.

The unitary part according to the invention made of plastics material corresponds to the safety standards by eliminating the risks of accidents caused by metallic parts.

Corrosion is excluded and any creaking sounds are avoided and the reduction of weight is also significant.

It is no longer necessary to incorporate protective sheets between the constituents of the seat back and the stuffing or lining since the plastics material eliminates aggressive effects caused by metallic systems that may wear and tear stuffing elements.

The unitary grid comprised by the back of the seat may as does the unitary part be flush or not with its stuffing with the contacting surface of the seat back.

Similarly, the supple unitary element 1 may as well as the supple unitary grid 5 be designed so as to have a contour of any type and present determined shapes directed in preferential directions such as the upwardly directed trapezoidal shape shown in FIG. 6.

Figure 7:
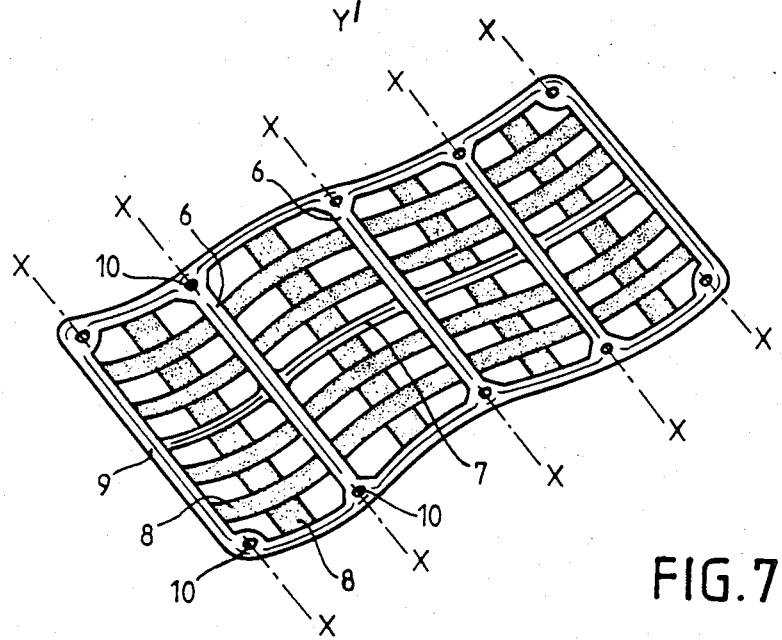
FIG. 7 is also a perspective view of a unitary part according to the invention applied to the seat proper.

The form of embodiment of FIG. 7 shows a supple unitary grid of plastics material for fitting the seat proper, such grid also having preferential deformation axes in accordance with the location of the spacers 6 comprised thereby. The straps 8 provided therefor can be placed so as to constitute a kind of network.

In any case, with a seat back element or a seat element, the number of the straps can be reduced or they also may be totally absent.

Finally, it will be understood that this invention was only described and represented by way of preferential exemplifying forms of embodiment and that equivalent parts can be substituted for its constituents without however departing from its scope.

I claim:

1. An improved vehicle seat back supporting system having a frame, a cushion and a one-piece flexible web whereby the improvement comprises:

one-piece integrally flexible plastic web molded into a grid-like structure, said grid-like structure comprising a first pair of spaced-apart generally parallel rib members, a second pair of rib members interconnecting the ends of said first pair of rib members, at least one spacer rib member disposed intermediate said first pair of rib members and interconnecting the mid-portion of said second pair of ribs to provide support and flexibility in the vertical direction, a plurality of cross rib members interconnecting said first pair of rib members and said at least one spacer rib at selected spaced intervals along the length of said first pair of rib members to provide support and flexibility in the horizontal direction, a plurality of strap-like elements integrally formed with and extending intermediate at least selected rib members to prevent the foam of said cushion from extending through said grid, and a plurality of apertures formed in the peripheral portions of said grid-like structure at the intersections of said first pair and second pair of rib members and at the intersection of cross rib members and said first pair of rib members for enabling said grid to be connected to said frame.

2. The device of claim 1, further including additional support ribs integrally formed intermediate at least selected ones of said first and second pairs of rib members, said support ribs being directed at predetermined angles relative to said first and second pairs of rib members and located near one end of said grid to provide additional support to the cervical vertebrae of the individual sitting in said seat.

* * * * *